United States Patent
Clearwater

(10) Patent No.: US 11,331,787 B2
(45) Date of Patent: May 17, 2022

(54) REMOTE CONTROLLED LUGGAGE HANDLER APPARATUS

(71) Applicant: Wayne Clearwater, Dundalk (CA)

(72) Inventor: Wayne Clearwater, Dundalk (CA)

(*) Notice: Subject to any disclaimer, the term of this patent is extended or adjusted under 35 U.S.C. 154(b) by 363 days.

(21) Appl. No.: 16/660,889

(22) Filed: Oct. 23, 2019

(65) Prior Publication Data

US 2021/0122029 A1 Apr. 29, 2021

(51) Int. Cl.
| | |
|---|---|
| *B25J 5/00* | (2006.01) |
| *B66F 9/065* | (2006.01) |
| *B66F 9/075* | (2006.01) |
| *B66F 9/18* | (2006.01) |
| *B66C 13/40* | (2006.01) |
| *B66C 23/42* | (2006.01) |
| *B66C 1/44* | (2006.01) |
| *B62D 55/104* | (2006.01) |
| *B25J 15/02* | (2006.01) |

(52) U.S. Cl.
CPC ........... *B25J 5/005* (2013.01); *B25J 15/0253* (2013.01); *B62D 55/104* (2013.01); *B66C 1/44* (2013.01); *B66C 13/40* (2013.01); *B66C 23/42* (2013.01); *B66F 9/065* (2013.01); *B66F 9/07581* (2013.01); *B66F 9/183* (2013.01)

(58) Field of Classification Search
CPC ......... B25J 5/005; B25J 15/0253; B66F 9/183
See application file for complete search history.

(56) References Cited

U.S. PATENT DOCUMENTS

| | | | |
|---|---|---|---|
| 6,263,989 B1 | 7/2001 | Won | |
| 6,629,594 B2 | 10/2003 | Nagel | |
| 7,874,386 B2 | 1/2011 | Ben-Tzvi | |
| 8,327,960 B2* | 12/2012 | Couture | B62D 55/075 180/9.1 |
| 8,509,945 B1* | 8/2013 | Snaith | B64F 1/368 700/218 |
| 8,727,410 B2* | 5/2014 | Jones | B66F 11/048 294/183 |
| 10,016,902 B2 | 7/2018 | Podnar | |
| 10,486,311 B2* | 11/2019 | Mozeika | B25J 13/006 |
| 2015/0050111 A1 | 2/2015 | Townsend | |
| 2017/0057664 A1 | 3/2017 | Soudbakhsh | |
| 2021/0080965 A1* | 3/2021 | Starr | B25J 9/1697 |

* cited by examiner

*Primary Examiner* — Mark C Hageman

(57) ABSTRACT

A remote controlled luggage handler apparatus for loading and unloading luggage from tour buses includes a carrier body having a pair of drive tracks. A multi-axis arm has a base pivot unit coupled to a body top side, a proximal segment coupled to the base pivot unit, a distal segment, and a head pivot unit. A jaw comprises a jaw support coupled to the head pivot unit, a fixed mandible coupled to the jaw support, and a sliding mandible slidably coupled to the jaw support to secure a suitcase between the fixed mandible and the sliding mandible. A CPU, a first transceiver, and a battery are coupled within the carrier body. A remote control is in operational communication with the first transceiver to control the drive tracks and the arm. A charging port is configured to be installed within a storage bay of a tour bus to charge the battery.

6 Claims, 6 Drawing Sheets

REMOTE CONTROLLED LUGGAGE HANDLER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to luggage handling devices and more particularly pertains to a new luggage handling device for loading and unloading luggage from tour buses.

(2) Description of Related Art Including Information Disclosed Under 37 CFR 1.97 and 1.98

The prior art relates to luggage handling devices.

BRIEF SUMMARY OF THE INVENTION

An embodiment of the disclosure meets the needs presented above by generally comprising a carrier body having a body top side, a body bottom side, a body front side, a body back side, a body left side, and a body right side. A plurality of drive motors is coupled within the carrier body. A pair of drive tracks is coupled to the body left side and the body right side. A multi-axis arm has a base pivot unit coupled to the body top side, a proximal segment coupled to the base pivot unit, a distal segment coupled to the proximal segment, and a head pivot unit coupled to the distal segment. The arm has a plurality of arm motors to manipulate each of the base pivot unit, the proximal segment, the distal segment, and the head pivot unit. A jaw comprises a jaw support coupled to the head pivot unit, a fixed mandible coupled to the jaw support, and a sliding mandible slidably coupled to the jaw support. The jaw is configured to secure a suitcase between the fixed mandible and the sliding mandible. A CPU is coupled within the carrier bod and is in operational communication with each of the drive motors and the arm motors. A first transceiver is coupled to the CPU. A battery is coupled within the carrier body and is in operational communication with the CPU and with each of the drive motors and the arm motors. The battery has a pair of charging leads extending through the body bottom side. A remote control has a second transceiver in operational communication with the first transceiver. A charging port is in operational communication with the charging leads of the battery and is configured to be installed within a storage bay of a tour bus.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
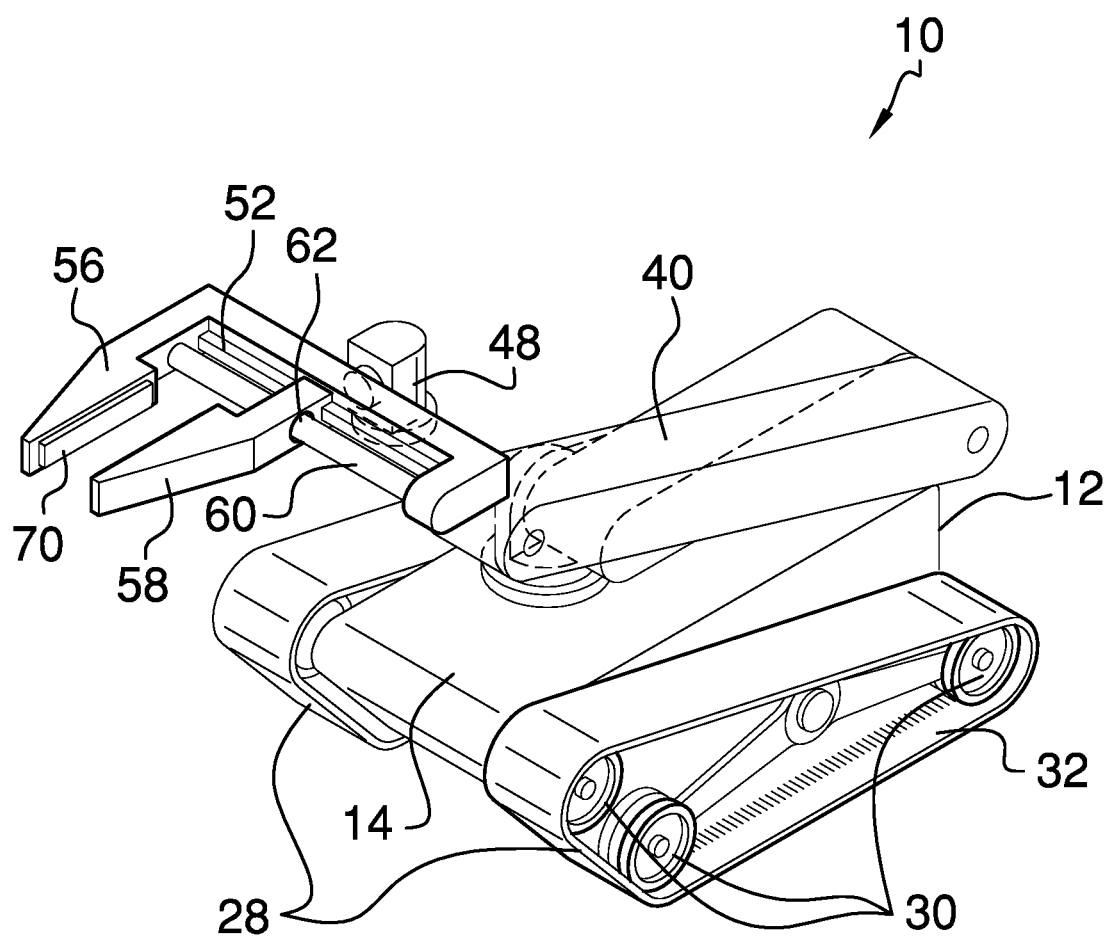
FIG. 1 is an isometric view of a remote controlled luggage handler apparatus according to an embodiment of the disclosure.
Figure 2:
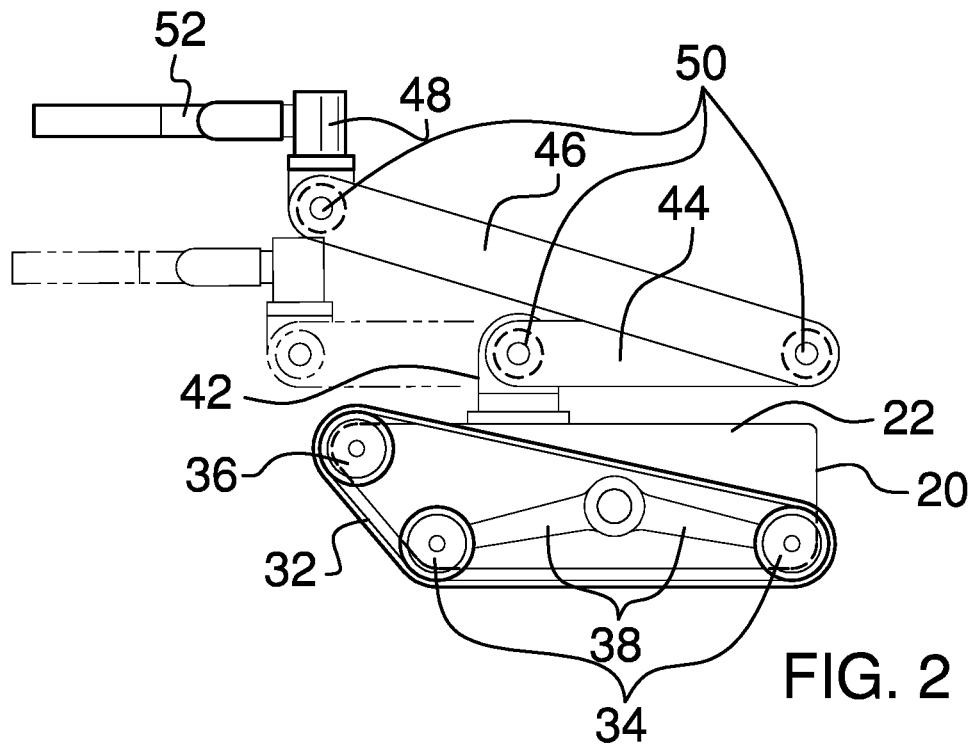
FIG. 2 is a side elevation view of an embodiment of the disclosure.
Figure 3:
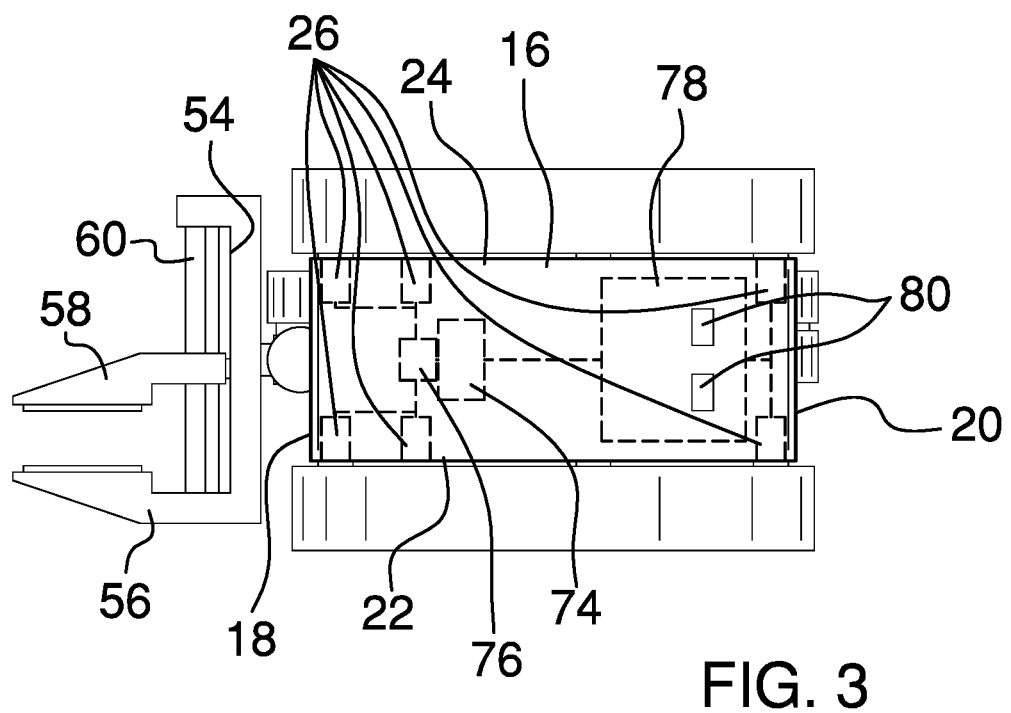
FIG. 3 is a bottom plan view of an embodiment of the disclosure.
Figure 4:
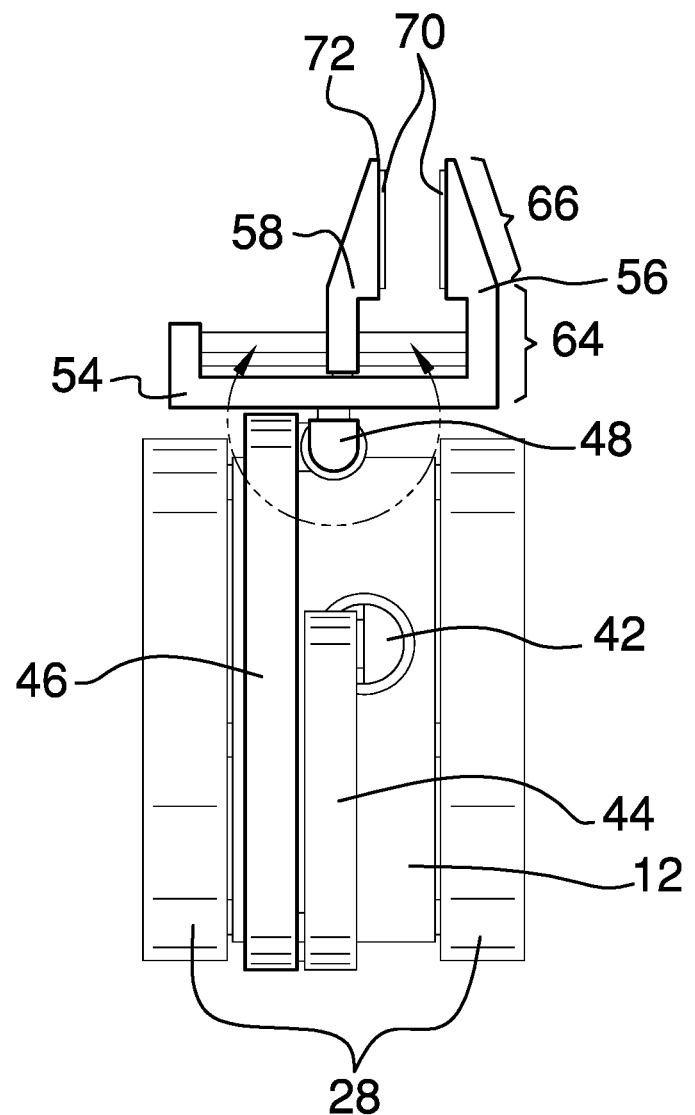
FIG. 4 is a top plan view of an embodiment of the disclosure.
Figure 5:
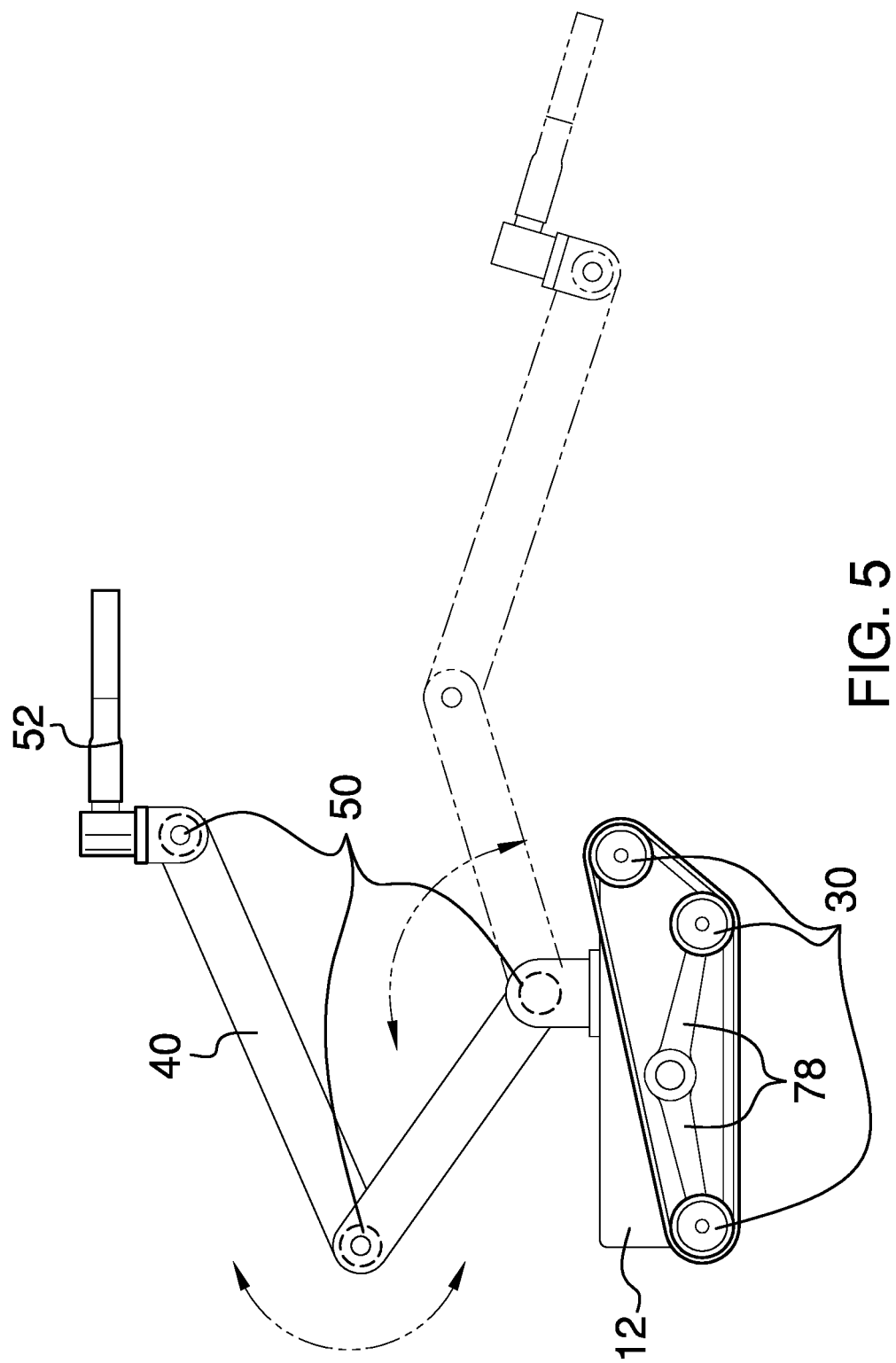
FIG. 5 is a side elevation view of an embodiment of the disclosure.
Figure 6:
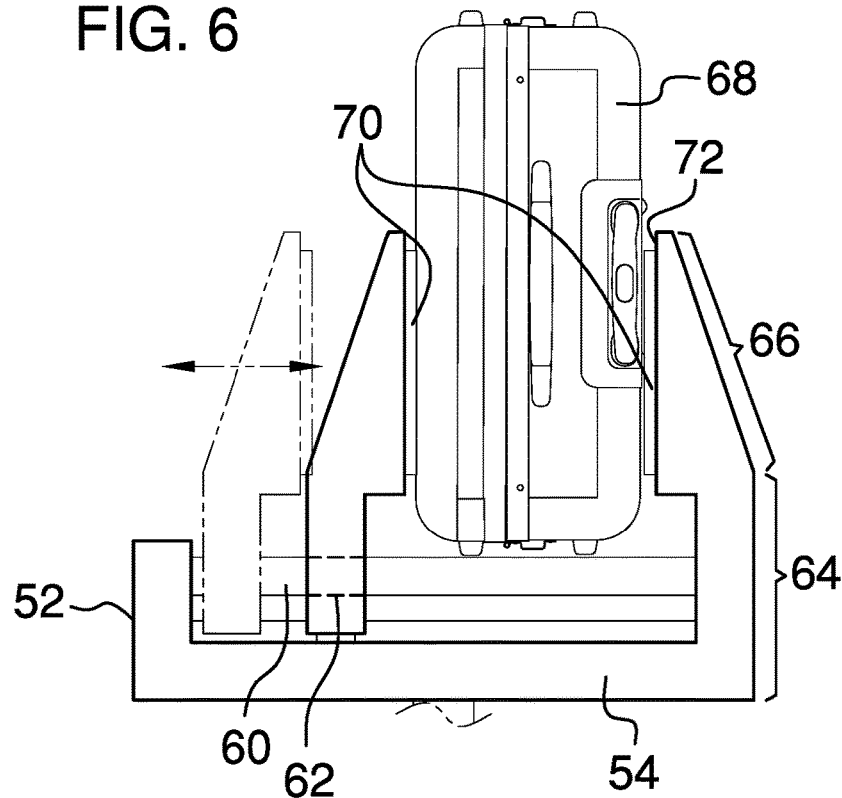
FIG. 6 is a detail view of an embodiment of the disclosure.
Figure 7:
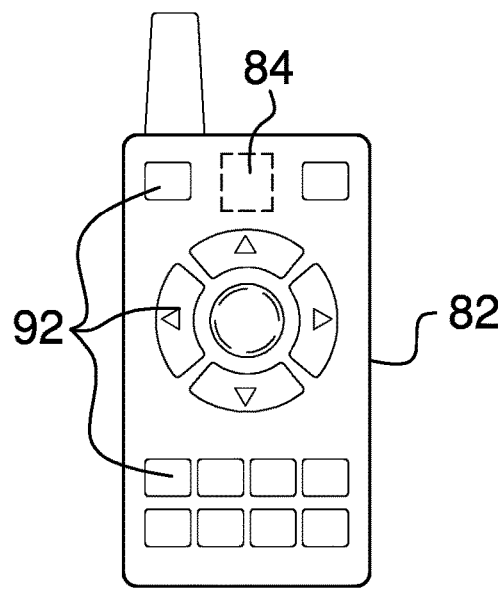
FIG. 7 is a detail view of an embodiment of the disclosure.
Figure 8:
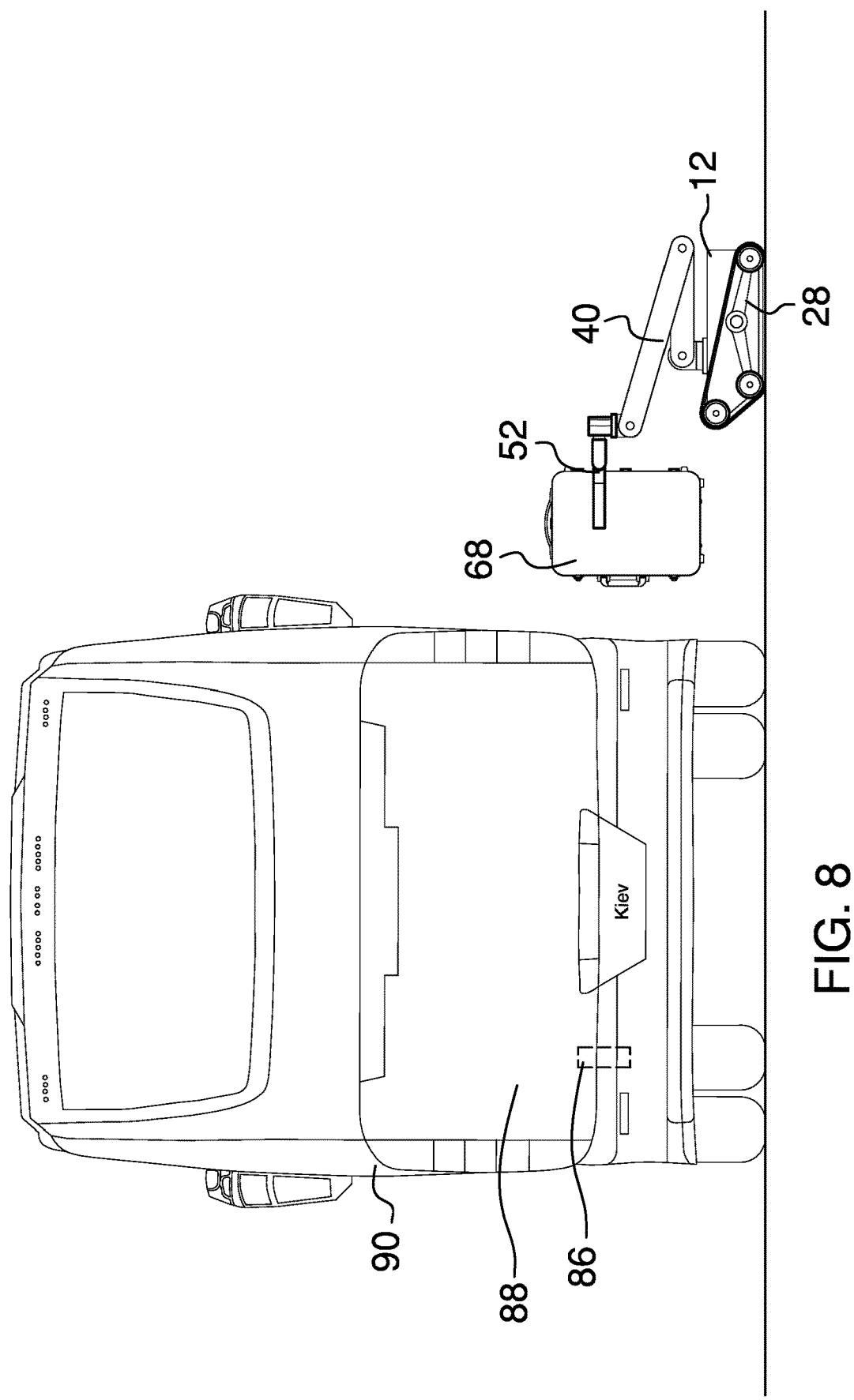
FIG. 8 is an in-use view of an embodiment of the disclosure.

With reference now to the drawings, and in particular to FIGS. 1 through 8 thereof, a new luggage handling device embodying the principles and concepts of an embodiment of the disclosure and generally designated by the reference numeral 10 will be described.

As best illustrated in FIGS. 1 through 8, the remote controlled luggage handler apparatus 10 generally comprises a carrier body 12 having a body top side 14, a body bottom side 16, a body front side 18, a body back side 20, a body left side 22, and a body right side 24. A plurality of drive motors 26 is coupled within the carrier body 12. A pair of drive tracks 28 is coupled to the body left side 22 and the body right side 24. Each of the pair of drive tracks 28 has a plurality of drive sprockets 30 and a tread 32 coupled to the plurality of drive sprockets 30. The drive sprockets 30 may comprise a pair of ground sprockets 34 and a raised front sprocket 36. The pair of ground sprockets 34 is coupled to a pair of suspension arms 38 to allow the tread 32 to handle uneven terrain.

A multi-axis arm 40 is coupled to the carrier body 12. The arm 40 has a base pivot unit 42 coupled to the body top side 14, a proximal segment 44 coupled to the base pivot unit 42, a distal segment 46 coupled to the proximal segment 44, and a head pivot unit 48 coupled to the distal segment 46. The arm 40 has a plurality of arm motors 50 to manipulate each of the base pivot unit 42, the proximal segment 44, the distal segment 46, and the head pivot unit 48. A jaw 52 is coupled to the arm 40. The jaw 52 comprises a jaw support 54 coupled to the head pivot unit 48, a fixed mandible 56 coupled to the jaw support 54, and a sliding mandible 58 slidably coupled to the jaw support 54. The jaw support 54 has a guide rail 60 extending through a guide aperture 62 of the sliding mandible 58. Each of the fixed mandible 56 and the sliding mandible 58 has an extension portion 64 and a triangular head portion 66. The jaw 52 is configured to secure a suitcase 68 between the fixed mandible 56 and the sliding mandible 58. A pair of grip pads 70 may be coupled to an inner face 72 of each triangular head portion 66 to prevent slippage and damage to the suitcase 68.

A CPU 74 is coupled within the carrier body 12. The CPU 74 is in operational communication with each of the drive motors 26 and the arm motors 50. A first transceiver 76 is coupled to the CPU 74. A battery 78 is coupled within the carrier body 12. The battery 78 is in operational communication with the CPU 74 and with each of the drive motors 26 and the arm motors 50. The battery 78 has a pair of charging leads 80 extending through the body bottom side 16. A remote control 82 has a second transceiver 84 in operational communication with the first transceiver 76. A charging port 86 is in operational communication with the charging leads 80 of the battery and is configured to be installed within a storage bay 88 of a tour bus 90.

In use, a plurality of buttons 92 of the remote control 82 is used to manipulate the drive motors 26 and the arm motors 50 to load luggage in and out of the storage bay 88 of the tour bus 90. The arm 40 places the jaw 52 in position and moves the sliding mandible 58 to secure the suitcase 68. The arm 40 then lifts the suitcase 68 to the new desired position and releases the jaw 52. When complete, the apparatus 10 returns within the storage bay 88 and connects to the charging port 86 to recharge the battery 78.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A remote controlled luggage handler apparatus comprising:
   a carrier body, the carrier body having a body top side, a body bottom side, a body front side, a body back side, a body left side, and a body right side;
   a plurality of drive motors coupled within the carrier body;
   a pair of drive tracks coupled to the carrier body, the pair of drive tracks being coupled to the body left side and the body right side;
   a multi-axis arm coupled to the carrier body, the arm having a base pivot unit coupled to the body top side, a proximal segment coupled to the base pivot unit, a distal segment coupled to the proximal segment, and a head pivot unit coupled to the distal segment, the arm having a plurality of arm motors to manipulate each of the base pivot unit, the proximal segment, the distal segment, and the head pivot unit;
   a jaw coupled to the arm, the jaw comprising a jaw support coupled to the head pivot unit, a fixed mandible coupled to the jaw support, and a sliding mandible slidably coupled to the jaw support, the jaw being configured to secure a suitcase between the fixed mandible and the sliding mandible;
   a CPU coupled within the carrier body, the CPU being in operational communication with each of the drive motors and the arm motors;
   a first transceiver coupled to the CPU;
   a battery coupled within the carrier body, the battery being in operational communication with the CPU and with each of the drive motors and the arm motors, the battery having a pair of charging leads extending through the body bottom side;
   a remote control, the remote control having a second transceiver in operational communication with the first transceiver; and
   a charging port, the charging port being in operational communication with the charging leads of the battery and being configured to be installed within a storage bay of a tour bus.

2. The remote controlled luggage handler apparatus of claim 1 further comprising each of the pair of drive tracks having a plurality of drive sprockets and a tread coupled to the plurality of drive sprockets.

3. The remote controlled luggage handler apparatus of claim 1 further comprising each of the fixed mandible and the sliding mandible having an extension portion and a triangular head portion.

4. The remote controlled luggage handler apparatus of claim 3 further comprising a pair of grip pads coupled to an inner face of each triangular head portion.

5. The remote controlled luggage handler apparatus of claim 1 further comprising the jaw support having a guide rail extending through a guide aperture of the sliding mandible.

6. A remote controlled luggage handler apparatus comprising:
   a carrier body, the carrier body having a body top side, a body bottom side, a body front side, a body back side, a body left side, and a body right side;
   a plurality of drive motors coupled within the carrier body;
   a pair of drive tracks coupled to the carrier body, the pair of drive tracks being coupled to the body left side and the body right side, each of the pair of drive tracks having a plurality of drive sprockets and a tread coupled to the plurality of drive sprockets;

a multi-axis arm coupled to the carrier body, the arm having a base pivot unit coupled to the body top side, a proximal segment coupled to the base pivot unit, a distal segment coupled to the proximal segment, and a head pivot unit coupled to the distal segment, the arm having a plurality of arm motors to manipulate each of the base pivot unit, the proximal segment, the distal segment, and the head pivot unit;

a jaw coupled to the arm, the jaw comprising a jaw support coupled to the head pivot unit, a fixed mandible coupled to the jaw support, and a sliding mandible slidably coupled to the jaw support, the jaw support having a guide rail extending through a guide aperture of the sliding mandible, each of the fixed mandible and the sliding mandible having an extension portion and a triangular head portion, the jaw being configured to secure a suitcase between the fixed mandible and the sliding mandible;

a pair of grip pads coupled to the jaw, the pair of grip pads being coupled to an inner face of each triangular head portion;

a CPU coupled within the carrier body, the CPU being in operational communication with each of the drive motors and the arm motors;

a first transceiver coupled to the CPU;

a battery coupled within the carrier body, the battery being in operational communication with the CPU and with each of the drive motors and the arm motors, the battery having a pair of charging leads extending through the body bottom side;

a remote control, the remote control having a second transceiver in operational communication with the first transceiver; and a charging port, the charging port being in operational communication with the charging leads of the battery and being configured to be installed within a storage bay of a tour bus.

* * * * *